April 8, 1958
H. JENSEN
2,829,557
STABILIZED OPTICAL SIGHTING DEVICE
Filed Jan. 17, 1950
2 Sheets-Sheet 1
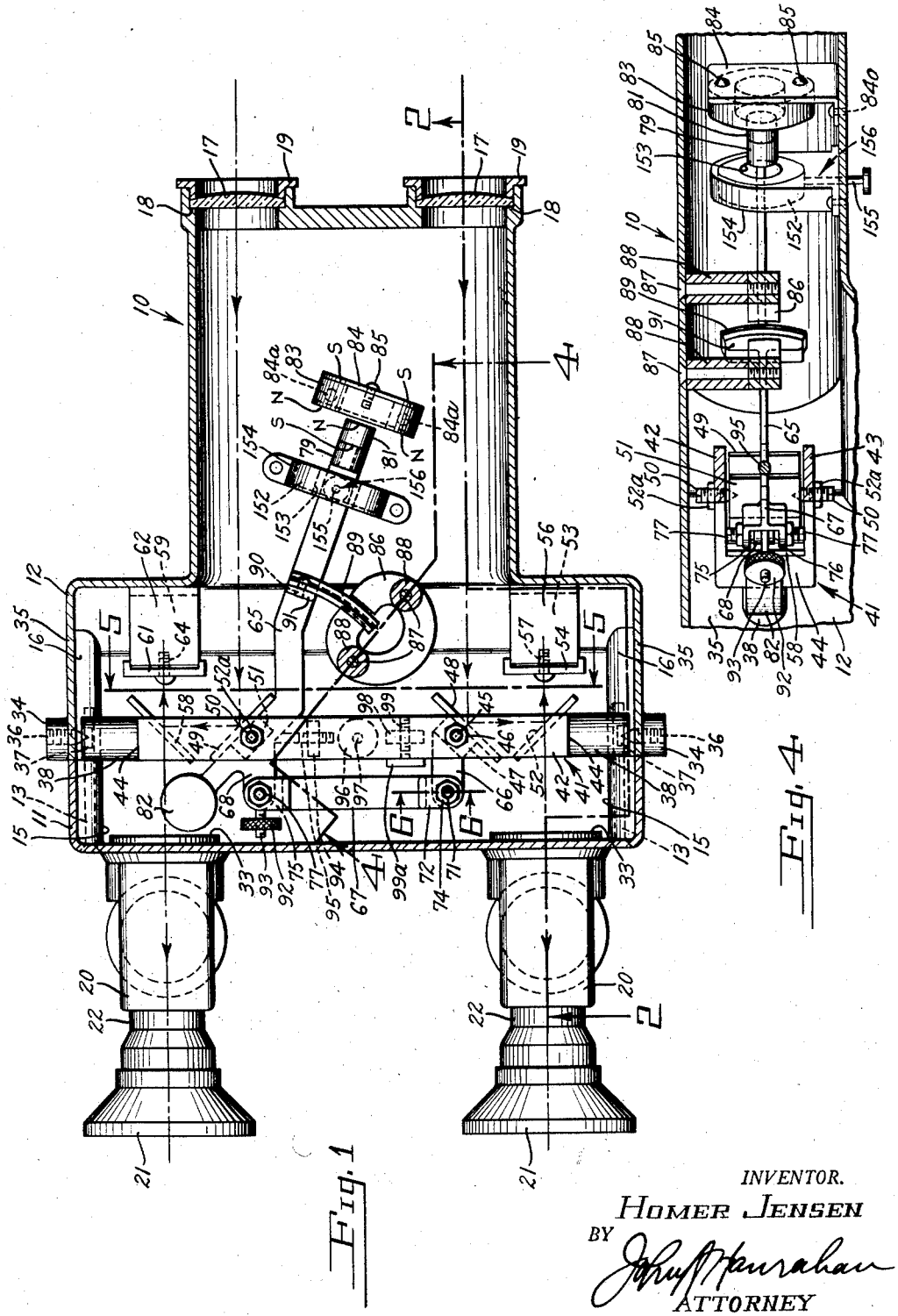
INVENTOR.
HOMER JENSEN
BY
ATTORNEY

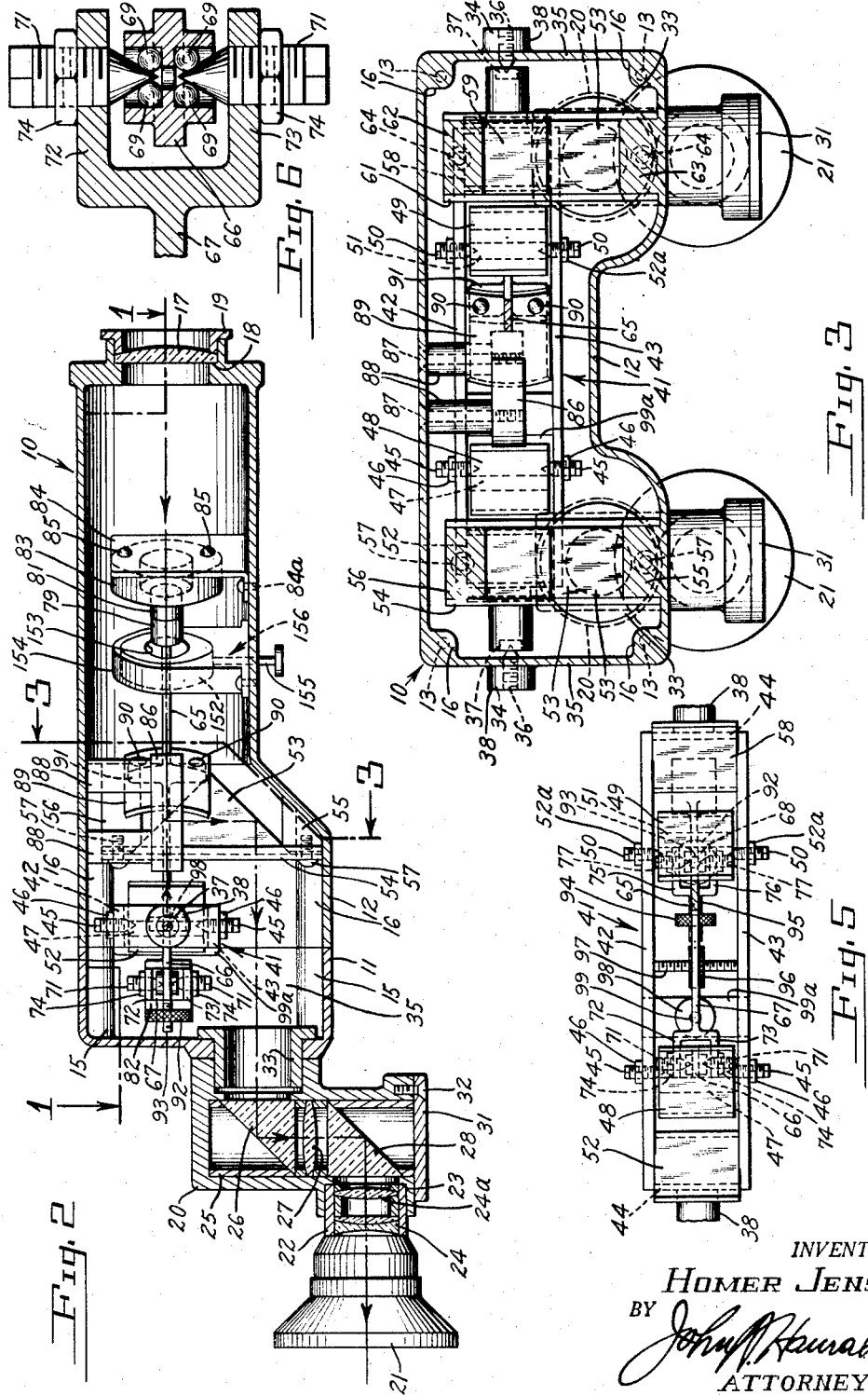

United States Patent Office 2,829,557
Patented Apr. 8, 1958

2,829,557

STABILIZED OPTICAL SIGHTING DEVICE

Homer Jensen, Philadelphia, Pa.

Application January 17, 1950, Serial No. 139,095

7 Claims. (Cl. 88—34)

The present invention relates to stabilized optical sighting devices and it relates more particularly to such devices wherein relatively high-frequency small amplitude movement of the image due to angular motions of the sighting device can be minimized or eliminated.

One severe limitation in the use of binoculars, telescopes, and other optical sighting devices which are handheld or mounted on vibrating structures, i. e., the decks of ships or the structure of airplanes, is the relatively high-frequency low amplitude vibration of the image due to angular vibrations such as are caused by trembling of the hands, or vibration of the platform.

Most such optical instruments contain, or could be made to include, mirrors or mirror systems. A common type of such system is the Porro-prism system, which serves to compress the optical paths of a telescope, and to erect the image, for examination by the ocular. Since binoculars in their most common form contain porroprisms, a binocular telescope will be used as the example of the principles of my invention. Since the binocular telescope is but a pair of telescopes, the principles illustrated will apply to simple telescopes.

It is well known that if a thin lens is rotated about an axis within the lens and at right angles to the optical axis of the lens, then small angular motions will cause no appreciable translation of the image formed by the lens. If, however, the axis of rotation lies elsewhere, than within the lens, but is still perpendicular to the optical axis of the lens, then there is a bodily circular movement of the lens about such axis as a fulcrum point and such rotations of the lens will be accompanied by translations in space, and hence by equivalent translations of the image.

It is an object of my invention to provide in an optical system including a lens and an image-receptor rigidly connected to said lens, means whereby there will be no appreciable motion of the optical image formed by the lens relative to the image-receptor regardless of angular motions of the lens-image-receptor system, provided that the angular motions be small and the lens-object distance be relatively large. I attain this objective by taking advantage of the phenomena mentioned in the immediately preceding paragraph of this specification. To the desired end, I locate a reflecting surface or surfaces at the approximate midpoint of the optical axis of the lensimage-receptor system described and mount such reflecting surface or surfaces for pivotal movement about axes parallel with the planes of such surfaces and which axes intersect in said optical axis; the mounting being such that in effect such reflecting surface or surfaces are mounted on an independent fixed reference with respect to the lens-image-receptor system.

It is another and more specific object of my invention to provide in an optical device of the character described a mechanism comprising a low-pass mechanical filter mounting the reflecting surfaces whereby motions of the image formed by the lens in respect to the image-receptor will be, to a close approximation, only those resulting from motions of the filter mounted reflecting surface. In such instance, the low-pass filter may comprise a gyroscope or may comprise the mechanism described in my co-pending application Serial Number 110,619 filed August 16, 1949, now Patent No. 2,688,456, issued Sept 7, 1954.

Referring to the earlier paragraphs, it is evident that any angular motions of the lens-image-receptor system about any axis other than the optical axis of the lens must result in differential translatory motion of the image in regard to the image receptor. For analytical purposes, it is possible to resolve any axis of rotational motion into three mutually perpendicular components, and then to translate these axes parallel to themselves at will. If we make one of these component axes coincide with the optical axis, it will then cease to affect the relationship of the image and the image receptor; and only the remaining two orthogonal axes require correction. If we now shift these two axes until they intersect at the midpoint of the optical axial path from lens to image, we get into position to visualize more clearly the relations involved.

It will now be evident that in the above described systems relative motions of the lens (objective lens) and its rigidly related image-receptor will be confined to spherical motions whose center is the optical midpoint of the lens-image-receptor system. However, the translations of the image normal to the optical axis will be equal to that of the lens and in the same direction; while the translations of the image-receptor along this line will be equal but in the opposite direction. In other words, the motions of the image and image-receptor are mirror images of each other and the center of such motions is that point in the optical axis wherein perpendiculars to said axis and through said reflecting surface intersect— i. e., the optical midpoint. Thus, in the optical system of my invention the mirror or reflecting surface above outlined is constrained substantially at the optical midpoint of such system whereby the image produced is actually a mirror image and hence will move in the same manner as the image receptor. Here it is noted that for the purpose of this specification, the "constrained mirror" is to be considered as fixed in space.

In applying the principles enumerated above to an optical system it must be kept in mind that such principles are valid only insofar as very small angular motions of the optical system are concerned. This is due to the fact that the image plane is rotated and translated, with respect to the image-receptor, normal to its own surface as the system is rotated. Therefore, for large angles of movement, the approximations employed in the above considerations are not valid as the image will go seriously out of focus.

For the purpose of illustration of a solution of the stabilization problem involved in the present optical system, the first two reflecting surfaces of a conventional porro-prism system are now introduced into the problem. For this purpose, independent first-surface mirrors will be used rather than the interior reflecting surfaces of a right-angle prism, because of the different constraints required on the two mirror surfaces. One of the orthogonal axes of rotation of the system may arbitrarily be made parallel to the intersection of the two mirror planes.

In this arrangement, the first mirror is so placed that it lies at the midpoint of the optical path between the lens and the image-receptor. The angular attitude of this mirror is fixed in space. Now, the system comprising the lens and the image-receptor may be rotated about an axis parallel to the intersection of the first two mirror planes, for small angles, without causing any appreciable motion of the image on the image receptor.

Similarly, if the first two mirror surfaces are fixed in angular attitude as a pair, and the lens-receptor system is rotated about it on the remaining orthogonal axis (which axis will be normal to the intersect of the planes of the first two mirrors), then similar relations hold, i. e., there will be no appreciable relative motion of the image in regard to the image-receptor as a result of this rotation.

It is evident that the first mirror and the intersection of the first pair of mirrors cannot both lie at the midpoint of the optical path. Moreover, it is evident that if the first mirror is free to change angular relations with the second, then the orthogonal relations of the Porro-system are violated. Nevertheless, for the application envisaged, a sufficiently close approximation to the midpoint can be achieved for both mirror means, and a sufficiently good orthogonal relationship of the mirror surfaces is maintained, as long as the angular motions involved are small.

In the embodiment of the invention illustrated in the accompanying drawings and which I shall hereafter describe in detail, the principles of the present invention are incorporated in a Porro-prism binocular telescope. However, it will be evident to one skilled in the art that the principles of the invention are not limited to this particular application nor, in fact, to the Porro-prism system in any application, and that they apply equally well to monocular telescopes, drift sights and to certain photographic devices. Where the invention is incorporated in a structure including the Porro-prism system it is noted that the second prism of such system does not negative the above calculation, neither does the addition in the latter one-half of the optical system of any configuration of mirrors lying normal to the same planes to which the porro surfaces are normal. Therefore, I may discuss the application, of the general principles which I have enumerated, to a binocular telescope without limiting the application thereto.

The invention consists of three parts: first, an optical system which will maintain approximately constant relationship of image and image-receptor in spite of angular small motions of the system comprising the lens and the image receptor, provided that certain elements of the system are constrained in their angular motions; second, a satisfactory mechanical system for mounting the constrained elements, and constraining them properly; and third, a linkage such that in a binocular telescope the residual motions of the image in respect to eye-piece will be virtually identical for both halves of the binocular system.

The general principles of the optical system are described above; the principles of a satisfactory mechanical means of constraint are described in my co-pending application Serial Number 110,619 and a practical device illustrating the principles in a binocular telescope is shown in detail in this application.

It will be evident to one skilled in the art that other combinations of constrained surfaces will achieve the same stabilizing effect. For instance, if the third and fourth mirror surfaces, as a pair, and the fourth mirror individually are constrained as above, stabilization will have been achieved. It is the intent of my invention to anticipate such minor variations, as long as they observe the principles outlined above.

In the drawings:

Fig. 1 is a view of a binocular telescope partly in top plan and partly in section of one embodiment of the present invention, the section being along the line 1—1 of Fig. 2;

Fig. 2 is a similar view taken along the line 2—2 of Fig. 1;

Fig. 3 is a sectional view taken along line 3—3 of Fig. 2;

Fig. 4 is a detail sectional view taken along line 4—4 of Fig. 1;

Fig. 5 is a detail sectional view taken along line 5—5 of Fig. 1; and

Fig. 6 is a detail sectional view taken along line 6—6 of Fig. 1.

The binocular telescope form of the sighting device of the invention includes a housing 10 comprising hollow sections 11 and 12 connected together by pins 13 or the like passing through flanges 15 forming an integral part of a hollow section 11 and extending into like flanges 16 which form an integral part of the hollow section 12. Objective thin lenses 17 are held against shoulders 18 of hollow section 12 by means of collars 19. Secured to hollow section 11 are eyepiece housings 20.

Eyepieces 21 have projecting collars 22 which are held against shoulders 23 of the eyepiece housings 20. Projecting collar 22 is adapted to hold eyepiece lenses 24 and 24a in the various eyepieces constituting image-receptors. A sleeve 25 which is adapted to hold reflecting prism 26, lens 27 and reflecting prism 28 extends into eyepiece housing 20 and is held in place by means of a plate 31 which is secured to the eyepiece housing 20 by screws 32 or the like. A short tubular sleeve 33 extending through the end wall of hollow section 11 and projecting into eyepiece housing 20 permits rotation of eyepiece housing 20 to adjust for various interocular separations.

Cylindrical lugs 34 are brazed or otherwise suitably fastened to the side walls 35 of hollow section 12 and are adapted to receive fulcrum screws 36 which project through said walls 35 and are in direct alignment. The portion of screws 36 projecting into hollow section 12 are pointed or cone-shaped and are received by bearings 37 held by shafts 38. Shafts 38 form an integral part of a rectangular frame or gimbal 41 comprising upper bar 42, lower bar 43 and end members 44 whereby said gimbal is pivotally mounted about the axis formed by the fulcrum screws 36.

Adjustable fulcrum screws 45 which are in direct alignment project through bars 42 and 43 of gimbal 41 and are locked by nuts 46. The inner ends of said fulcrum screws 45 are pointed or cone-shaped and are received by a bearing in hub 47 to which is secured first reflecting surface 48 which in the embodiment shown is a first surface mirror. Thus, reflecting surface 48 is able to be rotated freely about the axis formed by said mounting screws 45 with a minimum of friction. This first reflecting surface 48 is located substantially at the midpoint of the optical path from the lens 17 to the image receptor or ocular of its half of the binocular. Further, the axes formed by the centers of screws 36 and 45 substantially intersect substantially at the mid-point of said optical path.

As a binocular comprises two telescopes or monoculars, it is evident that there are two complete optical systems in any binocular telescope. Thus, a second first reflecting surface 49 comprising a first surface mirror is also present. This reflecting surface is exactly similar to surface 48 and is similarly held in gimbal 41 by means of fulcrum screws 50 which extend through upper bar 42 and lower bar 43 into hub 51 and are held securely in place by locknuts 52a thereby also being able to rotate about the axis formed by fulcrum screws 50. Additionally, reflecting surface 49 is located substantially midway along the optical path between the second lens 17 and the second ocular or image receptor. Also, the axes formed by the centers of screws 36 and 50 substantially intersect substantially at the midpoint of said optical path. For convenience, the screws 36 and 50 carrying the first reflecting surfaces of the two optical systems of the binocular may be referred to as second gimbals, and the gimbal 41 may be referred to as the first gimbal within which the second gimbals are pivoted, the first gimbal being pivoted within the housing for movement about an axis at right angles to the optical axis of the device, and the second gimbals being pivoted within the first gimbal on axes normally at right angles to the optical axis of the optical systems and to the axis of the first gimbal.

A second reflecting surface which is shown as a first-surface mirror 52 is securely mounted between upper bar 42 and lower bar 43 whereby reflections from first reflecting surface 48 are received by said second reflecting surface 52 and in turn reflected to a prism 53. Prism 53 is held in place by prism holder 54 which is fabricated in the form of a rectangular frame. Prism holder 54 is secured to lugs 55 and 56, which form an integral part of hollow section 12, by suitable means, such as screws 57.

The other half of the binocular telescope also has a second reflecting surface 58 comprising a first surface mirror securely mounted between upper bar 42 and lower bar 43 whereby reflections from first reflecting surface 49 are in turn reflected by reflecting surface 58 to a prism 59. Prism 59 is secured to hollow section 12 in exactly the same manner as prism 53. The prism 59 is held by a frame 61 which is secured to lugs 62 and 63 forming an integral part of hollow section 12 by suitable means, such as screws 64.

First reflecting surfaces 48 and 49 are carried by a low-pass filter, presently to be described, whereby small amplitude relatively high frequency angular vibrations of housing 10, such as would be caused by trembling of the hands holding the binocular, are prevented from causing dancing of the image as seen at eyepieces or image receptor 21. The filter means comprises a bar 65 which is firmly secured to hub 51 of first reflecting surface 49 by suitable means whereby any rotational movement of reflecting surface 49 about the axis formed by fulcrum screws 50 causes a like movement of bar 65. Conversely, any movement of bar 65 causes a like movement of reflecting surface 49.

First reflecting surface 48 is also connected to bar 65 by means of arm 66, forked link arm 67 and a projecting portion 68 of bar 65. Arm 66 is firmly secured to hub 47 of reflecting surface 48 whereby any movement of said arm causes a movement of said reflecting surface and vice versa. Arm 66 is recessed to contain ball bearings 69 (Fig. 6) which receive aligned fulcrum screws 71 extending through upper bar 72 and lower bar 73 of forked link arm 67 and held in place by locknuts 74.

It is thus evident that arm 66 and forked link arm 67 can move freely with respect to each other about the axis of fulcrum screws 71. The other end of link arm 67 is forked exactly as the end pivoted about screws 71 and has an upper bar 75 and a lower bar 76. Fulcrum screws 77 extend through said upper and lower bars and are received by ball bearings (not shown) which are contained in projecting portion 68 of bar 65. Thus, forked link arm 67 is connected to arm 66 and projecting portion 68 of bar 65 in exactly the same manner, and any movement of bar 65 will transmit a similar movement to first reflecting surface 49 and first reflecting surface 48. For the angular motions of reflecting surface 49 to be precisely equal to that of reflecting surface 48, the distance between fulcrums of the bar 67 would have to be equal to the distance between the fulcrums of the gimbal 41. However, for the small motions contemplated, an approximate equality, as shown in the drawing, will suffice.

One end of bar 65 is formed in the form of a cylinder 79 which is drilled to receive a cylindrical bar magnet 81. Secured to the other end of bar 65 is a counterweight 82 which is provided to statically balance bar 65 and the gimbaled elements linked thereto about the axis formed by fulcrum screws 50. For illustrative purposes, the counterweight 82 is shown as a single element.

A cylindrical orienting magnet 83 is preferably a permanent magnet although an electro-magnet may be employed. In the drawings, this magnet 83 comprises a section of a hollow right cylinder magnetized so that the lines of force are parallel to the geometric axis of the magnet and is mounted to a non-magnetic bracket 84 by means of screws 85. As the "centering" of bar magnet 81 is caused by the mutual repulsion of the field of the bar magnet and the field of cylindrical magnet 83, it is evident that cylindrical magnet 83 may actually have other configurations.

For example, the cylindrical magnet 83 may be made from a section of a right cylinder as indicated or it may be a composite magnet made up of a number of bar magnets mounted about a ring and having the respective north poles adjacent and the respective south poles adjacent. Suitable centering may also be achieved if the magnet instead of being a section of a right cylinder is in the form of a frustrum of a right circular cone. Similarly, a composite magnet can be made by securing the adjacent bar magnets to a shell in the form of a frustrum of a right circular cone.

By using such an arrangement, a slight angular displacement of bar 65 and associated bar magnet 81 results in a relatively small restoring force. As the angular displacement becomes greater the restoring force becomes much larger. The ratio of the restoring force is of a power higher than linear as related to displacement from the center. The non-magnetic bracket 84 is firmly secured to hollow section 12 by means such as rivets 84a. Cylindrical orienting magnet 83 is mounted on bracket 84 so that the geometric axis of said magnet is coincident with the axis of cylindrical bar magnet 81 and the axis of bar 65. The field of force set up by said cylindrical magnet 83 is such that its interaction with the field of bar magnet 81 will tend to maintain the position of said bar magnet along the geometric axis of the cylindrical magnet 83.

A second magnet 86, also preferably although not necessarily a permanent magnet, is fixed to hollow section 12 by means of screws 87 on hollow posts 88, the latter serving to position said magnet a fixed distance away from the wall of hollow section 12. Fixed to bar 65 so as to be located between the poles of the magnet 86 is a non-magnetic conducting element 89. This element is preferably of aluminum or the like and is formed by a piece of relatively thin stock and is somewhat in the shape of a dish. It is concavo-convex and of the same structure as though it were cut from the section or a wall of a hollow sphere. The element is secured to bar 65 by suitable means such as screws 90 received by a vertical thickened stud 91 which forms an integral part of bar 65.

Although counterweight 82 aids in balancing bar 65 and the gimbaled elements linked thereto, an exact static balance is achieved by suitable means such as movable counterweights. One combination of movable counterweights is used to statically balance the mass with respect to the axis formed by fulcrum screws 50. This combination includes a weight 92 positionable along, and carried by a screw 93 which is fixed to projecting portion 68 of bar 65.

The second portion of this combination is similar to the first and includes a weight 94 which is positionable along a screw 95, said screw being secured to bar 65. Screws 93 and 95 are at right angles to one another although not in the same plane and their imaginary point of intersection is along the axis formed by fulcrum screws 50. Thus, by positioning these two movable weights 92 and 94 along their respective screws just as a nut is moved along a bolt, the combination is statically balanced about the axis of the fulcrum screws 50.

A second combination of movable weights exactly similar to the first combination of weights is used to statically balance the gimbaled mass with respect to the axis formed by fulcrum screws 36. This second combination is shown as including a movable weight 96 carried by a screw 97 which extends between and at right angles to upper bar 42 and lower bar 43 of gimbal 41. The second portion of the combination is similar to the first and includes a movable weight 98 carried by a screw 99. Screw 97 and screw 99 are at right angles to one another although not in the same plane and their imaginary point of intersection lies along the axis formed by fulcrum screws 36. Screw 99 is held in the proper position by a suitable means, such as, for example, a bracket 99a secured to upper bar 42 and lower bar 43 of gimbal 41.

Thus, the entire mass is statically balanced by balancing the mass carried by gimbal 41 about the axis of fulcrum screws 50 by careful positioning of the weights 92 and 94 along their respective carrying screws. Gimbal 41 is then placed in fulcrum screws 36 and statically balanced about that axis by the nut-like movement of weights 96 and 98.

The foregoing mechanism constitutes means whereby the first and second reflecting surfaces are constrained in their movements and are mounted in space as to the lens and image receptor or on an independent reference. In view of the foregoing description, the invention may be readily understood. As the first reflecting surfaces 48 and 49 are located substantially at the midpoint of the optical path from the lens 17 to the image receptors and as such surfaces are mounted on axes normal to said optical path and intersecting substantially at its midpoint, the results first described above are obtained. In the physical structure shown in the drawings, the first reflecting surfaces 48 and 49 are located as described with the second reflecting surfaces 52 and 58 mounted on gimbal 41 and the entire gimballed mass including bar 65 bar magnet 81 and counterweight 82 have been statically balanced and as the friction of the fulcrum screws 36 and bearings 37 is kept very small, any low amplitude relatively high frequency angular motion of the entire binocular telescope will cause virtually no angular movement in the plane of the reflecting surfaces 48 and 49, and virtually no angular motion about the fulcrums 36 of the pairs of mirrors, 49 and 58, and 48 and 52.

Since a fixed angular position of mirrors 48 and 49 at the approximate midpoint of the optical paths from objectives 17 to their image receptor will prevent lateral motion of the image in respect to the receptors; and since a fixed angular position of the mirror pairs 49 and 58, and 48 and 52, at approximately the same position on the optical path will prevent vertical motion of the image in respect to the eyepieces or receptors, it is evident that correction has now been made to prevent virtually all motion of the image in respect to the eyepiece or receptor, under the described conditions of small amplitude, high-frequency angular oscillations of the frame. With the optical system of the invention the reflecting surfaces and the gimbal axes are so positioned that if the housing is moved angularly in respect to an initial axis of viewing, and the inner part of the gimbal 41 is not moved angularly, then an entering ray through the nodal points of the objective and parallel with the initial axis of viewing will intercept the image receptor at the same point as did the initial ray coinciding with said initial axis of viewing, thus achieving stabilization of the image. In the case of an optical device employing an eyepiece as the image receptor, the entering ray through the nodal points of the objective and parallel with the initial axis of viewing will also traverse the eyepiece nodal points on paths parallel with the initial axis of viewing, thus achieving stabilization of the image.

The binocular telescope must, of course, respond to slower large amplitude movements, such as would be incurred in scanning a field of view. Under such conditions, the movement of the binocular and cylindrical orienting magnet 83 will cause a concomitant movement of bar magnet 81 so as to keep the bar magnet positioned so that its axis is approximately coincident with the geometric axis of the cylindrical magnet 83. It is thus evident that the reflecting primary surfaces would quickly follow any relatively low frequency angular movement and would not seriously lag behind the movement of the housing 10. The optical elements of the binocular would thereby always retain their proper angular relationship.

The damping means comprising the permanent magnet 86 and the non-magnetic conducting dish-like element 89 serves to quickly damp any oscillations which would be present due to the "following" action of the bar magnet 81 resulting from a relatively large amplitude angular shift of cylindrical magnet 83.

The stabilizing system including the bar 65, the cylindrical bar magnet 81, counterweight 82, cylindrical orienting magnet 83, permanent magnet 86 and non-magnetic conducting element 87, is more fully described in my copending application entitled "Stabilizing System," Serial Number 110,619 filed August 16, 1949, now Patent No. 2,688,456, issued Sept. 7, 1954.

While carrying a binocular or other sighting device of the character described, it is desirable to immobilize bar 65 in order to prevent any violent movement of the movable parts associated with the bar and subsequent damage thereto. Also, when using the device, it is desirable to immobilize the parts while scanning an area, the parts being unlocked for detailed examination. The freely movable parts of the device will not properly follow the rapid motions usually employed in scanning, and it is desirable that it be locked during this operation and then freed for the detailed examination of the particular objectives.

One type of lock or clamping means which can be used to hold bar 65 of the binocular rigid with housing 10, employs an iris diaphragm such as used in connection with a camera lens. Such a diaphragm is well known and essentially comprises a number of so-called iris leaves which are mounted on a ring. By rotating the ring, the circumference of the opening formed by the ends of the iris leaves projecting toward the center of the ring can be increased or decreased depending on the direction of rotation.

By placing such a diaphragm about bar 65 and rigid with housing 10 and further providing means for opening or closing the diaphragm, an excellent lock is provided. For example, when the diaphragm is open so as to have a relatively large circumference, bar 65 and its associated elements heretofore described are free to move just as if such lock were not present. Upon closing the diaphragm so as to bring it into close contact with bar 65, said bar is held rigid with housing 10 and is unable to move. One advantage of such a lock is that once mounted, whenever the diaphragm is closed, bar 65 and its bar magnet 81 are held exactly in the center of the cylindrical magnet 83. Thus the parts are in their position of optical alignment of the optical system, enabling the sighting device to be employed as a conventional sighting device for scanning an area.

As such a diaphragm is well known, for purposes of simplifying the drawing, it is shown schematically as a ring 152 having a variable opening 153. The iris leaves are not shown. It is understood that by rotating the ring in one direction the opening 153 is enlarged and conversely, by rotating it in the opposite direction the opening 153 is made smaller. A clamp 154 is secured to housing 10 of the binocular and is recessed to receive ring 152 whereby said ring can be rotated within clamp 154. Rotation of ring 152 to increase or decrease the size of opening 153 is achieved by means of an inner push rod 155 of cable release 156. The cable release is brought through housing 10 of the binocular. Thus, by operating push rod 155 of cable release 156, ring 152 can be rotated thereby increasing or decreasing the size of the opening.

Although the iris lock has just been described in connection with the binocular heretofore described, it is evident that it is also adapted for use in a monocular other sighting device of the general character herein described.

It is to be further understood that although the iris lock of the general character described is deemed preferable, other locking devices may be used. For example, it is possible to provide a friction clamp which can be brought into contact with the non-magnetic electrically conducting damping element and thereby hold it and its associated movable elements immobile when desired.

From the above description it will be understood that the invention is not limited to a binocular or monocular of the construction described above but rather is suitable for any optical sighting device wherein the effect of relatively low amplitude high-frequency angular vibrations are to be minimized. In the illustrated embodiment, the orienting magnet and the damping magnet have been shown and described as the permanent type. It is evident to one skilled in the art however that the necessary magnetic fields could be produced b ywell known electromagnetic means.

Regarding the reference to the thin objective lens 17 in the foregoing description, it is pointed out that the device is applicable for thick lenses as well, provided only that the object viewed be at a considerable distance; and that by modification of the position of the movable mirrors in the optical path, the device is equally applicable to complex lenses and lens systems of any sort.

Having thus set forth the nature of my invention, what I claim is:

1. A binocular including a housing having two objective lenses and two eyepiece lenses held thereby, a gimbal pivotally mounted within said housing, an image erecting system for each of said objective lenses, each erecting system comprising a first reflecting surface pivotally mounted on said gimbal the pivoting axis of said reflecting surface being normal to the pivoting axis of said gimbal and substantially in the plane of said reflecting surface and substantially at the midpoint of the optical path from the objective lens to the eyepiece lens, a second reflecting surface rigid with and carried by said gimbal and third and fourth reflecting surfaces rigid with said housing, linkage means connecting the first reflecting surfaces of each erecting system whereby movement of one of said first reflecting surfaces causes like movement of the other first reflecting surface, a permanent magnet carried by said housing and being in the form of a section of a hollow right cylinder having its lines of magnetic force substantially parallel with the geometric axis of said cylindrical magnet, a bar magnet rigid with one of said first reflecting surfaces and located along the geometric axis of said cylindrical magnet and therewith developing an increasing restoring torque as the bar magnet moves from centered relation with the cylindrical magnet, and damping means for said bar magnet.

2. In an optical sighting device including a housing, an objective lens and an image receptor held by said housing, a gimbal pivotally mounted within said housing, a second gimbal pivotally mounted on said first mentioned gimbal, the pivoting axes of said gimbals being normal to each other, an inertial stabilizing mass connected to said second gimbal and statically balanced independent of attitude, an erecting system including a pair of reflecting surfaces of which the second is rigid with the first gimbal and the first is rigid with the second gimbal and located at a point in the optical system where optical stabilization is thereby achieved, orienting means comprising a permanant magnet carried by said housing and being in the form of a section of a hollow right cylinder having its lines of magnetic force substantially parallel with the geometric axis of said cylindrical magnet, a bar magnet carried by said stabilizing mass and located along the geometric axis of said cylindrical magnet and developing therewith an increasing restoring torque as the bar magnet moves from centered relation therewith, and damping means to constrain oscillations of said gimbals comprising a first part carried by said stabilizing mass and a second part carried by said housing.

3. In an image-stabilized optical device including a housing, an objective lens and an image receptor held rigidly by said housing, a first gimbal pivoted within said housing for movement about an axis at right angles to the optical axis of the device, a second gimbal pivoted within said first gimbal on an axis normally at right angles to the optical axis and to the axis of said first gimbal, an image erecting system composed of reflecting surfaces, at least two of which are mounted on said gimbals, and at least one of which is mounted in said second gimbal, the reflecting surfaces and the gimbal axes being so positioned that if the housing is moved angularly in respect to an initial axis of viewing, and the second gimbal is not moved angularly, then an entering ray through the nodal points of the objective and parallel with said initial axis of viewing will intercept the image receptor at the same point as did the initial ray coinciding with said initial axis of viewing, thus achieving stabilizing of the image, balancing and stabilizing weight means connected to the gimbal mounted reflecting surfaces in such relation as to align their centers of gravity with their respective axes, thus making the gimbal mounted reflecting surfaces astatic, orienting means to cause the gimbal mounted reflecting surfaces to seek a position of alignment of the optical system, regardless of the attitude of the housing, said orienting means comprising a first part fixed with respect to said reflecting surface mounted in said second gimbal and a second part fixed with respect to said housing, said parts being arranged and adapted to coact with each other to normally center one part with relation to the other part and developing an increasing restoring torque as one part moves from centered relation with the other part, and damping means to constrain oscillations of said gimbal mounted reflecting surfaces comprising a first part rigid with said reflecting surface mounted in said second gimbal and a second part rigid with respect to said housing and in cooperative relation with said first part of the damping means to resist relative movement between said first and second parts of the damping means.

4. The invention as defined in claim 3, further characterized by manually operated clamping means carried by the housing associated with said reflecting surface mounted in said second gimbal to immobilize it with respect to said housing in the position of alignment of the optical system.

5. In an image-stabilized optical device including a housing, an objective lens and an image receptor held rigidly by said housing, a first gimbal pivoted within said housing for movement about an axis at right angles to the optical axis of the device, a second gimbal pivoted within said first gimbal on an axis normally at right angles to the optical axis and to the axis of said first gimbal, an image erecting system composed of reflecting surfaces in the arrangement of a Porro-prism system including a first reflecting surface mounted in said second gimbal, and a second mirror surface mounted in said first gimbal, a third reflecting surface receiving reflections from said second reflecting surface, and a fourth reflecting surface receiving reflections from said third reflecting surface and reflecting such reflections to said image receptor, said third and fourth reflecting surfaces being rigid with said housing, the reflecting surfaces and the gimbal axes being so positioned that if the housing is moved angularly in respect to an initial axis of viewing, and the second gimbal is not moved angularly, then an entering ray through the nodal points of the objective and parallel with said initial axis of viewing will intercept the image receptor at the same point as did the initial ray coinciding with said initial axis of viewing, thus achieving stablization of the image, balancing and stabilizing weight means connected to the first and second gimbal mounted reflecting surfaces in such relation as to align their centers of gravity with their respective axes, thus making the gimbal mounted reflecting surfaces astatic, orienting means to cause the gimbal mounted reflecting surfaces to seek a position of alignment of the optical system, regardless of the attitude of the housing, said orienting means comprising a first part fixed with respect to said first reflecting surface mounted in said second gimbal and a second part fixed with respect to said housing, said parts being arranged and adapted to coact with each other to normally center one part with relation to the other part and developing an increasing retoring torque as one part moves from centered relation with the other part, and damping means to constrain oscillations of said gimbal mounted reflecting surfaces comprising a first part rigid with said first reflecting surface and a second part rigid with respect to said housing and in cooperative relation with said first part of the damping means to resist relative movement between said first and second parts of the damping means.

6. In an image-stabilized optical sighting device including a housing, an objective lens and an eyepiece held rigidly by said housing, a first gimbal pivoted within said housing for movement about an axis at right angles to the optical axis of the device, a second gimbal pivoted within said first gimbal on an axis normally at right angles to the optical axis and to the axis of said first gimbal, an image erecting system composed of reflecting surfaces, at least two of which are mounted on said gimbals, and at least one of which is mounted in said second gimbal, the reflecting surfaces and the gimbal axes being so positioned that if the housing is moved angularly in respect to an initial axis of viewing, and the second gimbal is not moved angularly, then an entering ray through the nodal points of the objective and parallel with said initial axis of viewing will also traverse the eyepiece nodal points on paths parallel with the initial axis of viewing, thus achieving stabilization of the image, balancing and stabilizing weight means connected to the gimbal mounted reflecting surfaces in such relation as to align their centers of gravity with their respective axes, thus making the gimbal mounted reflecting surfaces astatic, orienting means to cause the gimbal mounted reflecting surfaces to seek a position of alignment of the optical system, regardless of the attitude of the housing, said orienting means comprising a first part fixed with respect to said reflecting surface mounted in said second gimbal and a second part fixed with respect to said housing, said parts being arranged and adapted to coact with each other to normally center one part with relation to the other part and developing an increasing restoring torque as one part moves from centered relation with the other part, and damping means to constrain oscillations of said gimbal mounted reflecting surfaces comprising a first part rigid with said reflecting surface mounted in said second gimbal and a second part rigid with respect to said housing and in cooperative relation with said first part of the damping means to resist relative movement between said first and second parts of the damping means.

7. In an image-stabilized binocular telescope including a housing, two objective lenses and two eyepieces held rigidly by said housing, a first gimbal means pivoted within said housing for movement about an axis at right angles to the optical axes of the device, second gimbal means pivoted within said first gimbal means at right angles to the optical axes and to the axis of said first gimbal means, two image erecting systems composed of reflecting surfaces, at least two reflecting surfaces of each said erecting system being mounted on said gimbal means, and at least one reflecting surface of each of said erecting system being mounted in said second gimbal means, the reflecting surfaces and the gimbal axes being so positioned that if the housing is moved angularly in respect to an initial axis of viewing, and the second gimbal means is not moved angularly, then an entering ray through the nodal points of each said objective and parallel with said initial axis of viewing will also traverse the respective eyepiece nodal points on paths parallel with the initial axis of viewing, thus achieving stabilization of the image, means cooperatively connecting the reflecting surfaces carried by said second gimbal means whereby movement of one said reflecting surface causes like movement of the other said reflecting surface, balancing and stabilizing weight means connected to the gimbal mounted reflecting surfaces in such relation as to align their centers of gravity with their respective axes, thus making the gimbal mounted reflecting surfaces astatic, orienting means to cause the gimbal mounted mirror surfaces to seek a position of alignment of the optical system, regardless of the attitude of the housing, said orienting means comprising a first part fixed with respect to at least one of said reflecting surfaces mounted in said second gimbal means and a second part fixed with respect to said housing, said parts being arranged and adapted to coact with each other to normally center one part with relation to the other part and developing an increasing restoring torque as one part moves from centered relation with the other part, and damping means to constrain oscillations of said gimbal mounted reflecting surfaces comprising a first part rigid with at least one of said reflecting surfaces mounted in said second gimbal means and a second part rigid with respect to said housing and in cooperative relation with said first part of the damping means to resist relative movement between said first and second parts of the damping means.

References Cited in the file of this patent

UNITED STATES PATENTS

| | | |
|---|---|---|
| 1,000,607 | Kellner | Aug. 15, 1911 |
| 1,628,776 | Henderson | May 17, 1927 |

FOREIGN PATENTS

| | | |
|---|---|---|
| 240,369 | Germany | Nov. 2, 1911 |